US010562084B2

(12) United States Patent
Sakaki et al.

(10) Patent No.: US 10,562,084 B2
(45) Date of Patent: Feb. 18, 2020

(54) CLAD STEEL PLATE WITH EXCELLENT THERMAL CONDUCTIVITY

(71) Applicant: NIPPON STEEL NISSHIN CO., LTD., Chiyoda-ku, Tokyo (JP)

(72) Inventors: Masahito Sakaki, Chiyoda-ku Tokyo (JP); Kouki Tomimura, Chiyoda-ku Tokyo (JP)

(73) Assignee: NIPPON STEEL NISSHIN CO., LTD., Tokyo (JP)

( * ) Notice: Subject to any disclaimer, the term of this patent is extended or adjusted under 35 U.S.C. 154(b) by 0 days.

(21) Appl. No.: 15/768,310

(22) PCT Filed: Oct. 14, 2016

(86) PCT No.: PCT/JP2016/080524
§ 371 (c)(1),
(2) Date: Apr. 13, 2018

(87) PCT Pub. No.: WO2017/065267
PCT Pub. Date: Apr. 20, 2017

(65) Prior Publication Data
US 2018/0304326 A1    Oct. 25, 2018

(30) Foreign Application Priority Data

Oct. 14, 2015  (JP) .................................. 2015-202564

(51) Int. Cl.
*B21B 1/38* (2006.01)
*B21B 1/26* (2006.01)
(Continued)

(52) U.S. Cl.
CPC .................. *B21B 1/38* (2013.01); *B21B 1/26* (2013.01); *B21B 1/28* (2013.01); *B21D 22/02* (2013.01);
(Continued)

(58) Field of Classification Search
CPC .... B21B 1/38; B21B 1/26; B21B 1/28; B21B 2001/383; B21D 22/02; B32B 3/02;
(Continued)

(56) References Cited

U.S. PATENT DOCUMENTS

2008/0105689 A1*  5/2008  Ren ....................... A47J 27/002
                                                              220/573.2
2016/0271674 A1*  9/2016  Huang ................... B21H 8/005

FOREIGN PATENT DOCUMENTS

CN           2892466 Y      4/2007
CN        101676097 A       3/2010
(Continued)

OTHER PUBLICATIONS

Extended European Search Report corresponding to Application No. 16855520.9-1103 PCT/JP2016080524; dated Jun. 18, 2018.
(Continued)

*Primary Examiner* — Dana Ross
*Assistant Examiner* — Joseph M Baillargeon
(74) *Attorney, Agent, or Firm* — Cantor Colburn LLP

(57) ABSTRACT

Provided is a clad steel plate with excellent thermal conductivity that can be used suitably in cookware and the like. The present invention is a three-layer clad steel plate having a carbon steel base material and stainless steel mating material disposed respectively on both surface sides of the base material, wherein a plate thickness ratio L given by Equation (1) is 1.0-5.0 and at least one surface of the clad steel plate has a plurality of protrusions and recesses. Plate thickness ratio L=the plate thickness of the base material/the total thickness of the mating material . . . Equation (1) Here, the base material thickness and the mating material thickness are the thicknesses at the protrusions.

1 Claim, 6 Drawing Sheets

(51) Int. Cl.
*B21B 1/28* (2006.01)
*B21D 22/02* (2006.01)
*B32B 3/26* (2006.01)
*B32B 15/01* (2006.01)
*C22C 38/40* (2006.01)
*B32B 3/06* (2006.01)
*B32B 3/28* (2006.01)

(52) U.S. Cl.
CPC ............ *B32B 3/263* (2013.01); *B32B 15/011* (2013.01); *C22C 38/40* (2013.01); *B21B 2001/383* (2013.01); *B32B 3/06* (2013.01); *B32B 3/28* (2013.01); *B32B 2250/03* (2013.01); *B32B 2307/302* (2013.01); *B32B 2311/30* (2013.01); *C21D 2251/02* (2013.01)

(58) Field of Classification Search
CPC ....... B32B 3/263; B32B 15/01; B32B 15/011; B32B 15/18; B32B 3/06; B32B 2250/03; B32B 2307/302; B32B 2311/30; C22C 38/00; C22C 38/40; C21D 2251/02
USPC ...... 219/621; 220/573.1; 428/156; 29/527.1, 29/573.2; 72/379.6
See application file for complete search history.

(56) References Cited

FOREIGN PATENT DOCUMENTS

| | | |
|---|---|---|
| CN | 104786582 A | 7/2015 |
| JP | 61157637 A | 7/1986 |
| JP | S64040188 A | 2/1989 |
| JP | H02263501 A | 10/1990 |
| JP | H05014610 B | 2/1993 |
| JP | 11080883 A | 3/1999 |
| JP | H11077888 A | 3/1999 |
| JP | 11152547 A | 6/1999 |
| JP | 3036988 B2 | 4/2000 |
| JP | 2002065469 A | 3/2002 |
| JP | 2004098136 A | 4/2004 |
| JP | 4171269 B2 | 10/2008 |
| JP | 2009045194 A | 3/2009 |
| NZ | 205964 A | 8/1986 |

OTHER PUBLICATIONS

Notice of Reasons for Rejection issued to JP Application No. 2016-563473, dated Mar. 7, 2017.

International Search Report corresponding to Application No. PCT/JP2016/080524; dated Nov. 29, 2016.

SIPO Office Action corresponding to CN Application No. 201680058269.2; dated Nov. 12, 2018.

* cited by examiner

CLAD STEEL PLATE WITH EXCELLENT THERMAL CONDUCTIVITY

CROSS REFERENCE TO RELATED APPLICATIONS

This is the U.S. national stage of application No. PCT/JP2016/080524, filed on Oct. 14, 2016. Priority under 35 U.S.C. § 119(a) and 35 U.S.C. § 365(b) is claimed from Japanese Application No. 2015-202564, filed on Oct. 14, 2015, the disclosure of which is also incorporated herein by reference.

TECHNICAL FIELD

The present invention relates to a clad steel plate having excellent thermal conductivity which can be used for cookware and the like.

BACKGROUND ART

Unlike direct heating with gas or heating elements, electromagnetic cookers indirectly heat a target object by virtue of electromagnetic induction. In an electromagnetic cooker, temperature will not increase except for at the target object, reducing risks of a burn and a fire. Further the emission of carbon dioxide is reduced. These characteristics appear to make electromagnetic cookers more popular.

For a material of a pan and the like used with an electromagnetic cooker, a thin stainless steel-clad steel plate including a stainless steel mating material and a low-carbon steel base material, and a clad steel plate having a stainless steel mating material and a base material made of aluminum or an aluminum alloy are often used in view of corrosion resistance and induction heating properties.

An electromagnetic cooker represents a safe and clean heating means as described above, but suffers from a slower heating rate and longer cooking time as compared with gas heating due to a limited power of the device as well as difficult broth penetration into food materials. Accordingly, a cookware product has recently been proposed including a stainless steel-clad steel plate having improved induction heating properties.

Meanwhile, a clad steel plate is known to have a use other than cookware. For example, Patent Document 1 proposes a two-layer or three-layer clad steel plate including a base material made of a mild steel having a carbon content of 0.005% or less and a mating material(s) made of stainless steel or nickel or a nickel alloy, the ratio (Al/N) of the amount of aluminum to the amount of nitrogen in the base material being 6 or more, and the amount of nitrogen contained in the mating material(s) being 0.01% or less.

Patent Document 2 proposes a stainless steel-clad steel plate having an outer layer material of stainless steel and a base material of low-carbon steel, the content of acid-soluble Al in the base material being 0.10 to 1.5% by weight.

Patent Document 3 proposes a clad steel material including an upper material, an intermediate material, and a lower material, the upper material including a ferrite-based stainless steel containing 10.0 to 30.0% by weight of Cr and having a plate thickness of 0.3 to 3.0 mm, the intermediate material including aluminum with a purity of 99% or more and having a plate thickness of 1.0 to 10.0 mm, and the lower material including a steel plate with a plate thickness of 3.0 to 30.0 mm.

Patent Document 4 proposes a method of manufacturing a patterned metal plate or a rainbow-colored metal plate, the method including cold-rolling or skin pass-rolling a clad material with a rolling roll having a pattern on a surface thereof, the clad material having a thin coating of a metal on a surface of an internal base material, the metal being softer than the base material.

Further, Patent Document 5 proposes a metal plate for a cookware product and a method of manufacturing the same, the metal plate having a large number of independent protrusions formed on a surface of the metal plate corresponding to an inner surface of the cookware product, and a flat continuous groove portion being formed between the respective independent protrusions.

Patent Document 1: Japanese Examined Patent Application Publication No. H05-14610
Patent Document 2: Japanese Unexamined Patent Application, Publication No. H11-77888
Patent Document 3: Japanese Unexamined Patent Application, Publication No. S64-40188
Patent Document 4: Japanese Unexamined Patent Application, Publication No. H02-263501
Patent Document 5: Japanese Unexamined Patent Application, Publication No. 2002-65469

DISCLOSURE OF THE INVENTION

Problems to be Solved by the Invention

According to the clad steel plate of Patent Document 1, the composition of the mild steel as the base material are defined, and the clad steel plate is subjected to temper rolling mainly for the purpose of improving workability, i.e., for the purpose of reducing development of a crack and wrinkle upon drawing process or extensive bending process when used as a kitchenware material such as a pan and kettle. However, Patent Document 1 does not provide information about a surface profile of the clad steel plate.

According to the stainless steel-clad steel plate of Patent Document 2, the contents of acid-soluble Al, C, Ti, and N in the low carbon steel as the base material are defined in view of induction heating properties and workability. However, Patent Document 2 does not provide information about the surface profile or heat transfer properties of the steel sheet.

The clad steel material according to Patent Document 3 includes ferrite-based stainless steel and aluminum. However, in the clad steel material according to Patent Document 3, the ferrite-based stainless steel has poor corrosion resistance, and aluminum suffers from poor abrasion resistance, resulting in possibly reduced cookware lifetime. Further, Patent Document 3 does not provide information about the surface profile of the clad steel material.

The method of manufacturing a patterned metal plate or a rainbow-colored metal plate via rolling process according to Patent Document 4 is intended to improve designability by performing rolling so that fine unevenness is formed on the surface of the clad plate. However, Patent Document 4 does not provide information about heat transfer properties of the patterned metal plate and the rainbow-colored metal plate.

In the metal plate for a cookware product and the method of manufacturing the same according to Patent Document 5, a large number of independent protrusions are formed on a surface of the metal plate corresponding to the inner surface of the cookware product, and a flat continuous groove portion is formed between the respective independent protrusions. A steel plate having an oxide film formed on a surface thereof may also be used as the above metal plate. The above metal plate for a cookware product may be manufactured by rolling a metal plate with an emboss roll. This metal plate for a cookware product is suitable for manufacturing a cookware product having a cooking surface which is resistant to burn dry. However, thermal conductivity is not mentioned in Patent Document 5.

A cookware material having thermal conductivity superior to that of a conventional clad steel plate and capable of electromagnetic induction heating has been desired.

An object of the present invention is to provide a clad steel plate having excellent thermal conductivity which can be suitably used for cookware and others.

Means for Solving the Problems

The present inventors conducted extensive studies about a clad steel plate having good thermal conductivity. During the course of the studies, the present inventors focused on a plate thickness ratio of a base material and mating materials in a three-layer clad steel plate having the base material and the mating materials, the base material including low-carbon steel, and the mating materials including stainless steel and being each disposed on either surface of the base material. When a three-layer clad steel plate having a plate thickness ratio L of 1.0 to 5.0 wherein "the plate thickness ratio L=the thickness of the base material/the total thickness of the mating materials" (Equation 1) was used as a basic material, a clad steel plate was obtained having good thermal conductivity and further excellent adhesiveness between the base material and the mating materials. Moreover, the present inventors also found that a plurality of protruded portions and depressed portions provided on a surface of at least one of the mating materials of the basic material can further improve thermal conductivity. Then the present invention has been completed. Specifically, the present invention can provide the followings.

An embodiment of the present invention is a three-layer clad steel plate including: a carbon steel base material; and stainless steel mating materials each disposed on either surface of the base material, a plate thickness ratio L represented by Equation (1) being 1.0 or more to 5.0 or less, and a plurality of protruded portions and depressed portions being formed on at least one surface of the clad steel plate, the plate thickness ratio $L$=the thickness of the base material/the total thickness of the mating materials    Equation (1), wherein the thickness of the base material and the thicknesses of the mating materials are those at the protruded portions.

Further, the area of the plurality of protruded portions is preferably 20 to 80% relative to the area of the surface of the clad steel plate on which the protruded portions are formed.

Moreover, the plurality of protruded portions and depressed portions preferably have a depression-protrusion difference of 0.02 mm or more to 0.2 mm or less in the plate thickness direction.

Effects of the Invention

According to the clad steel plate of an embodiment of the present invention, a plate thickness ratio L of 1.0 to 5.0 defined as the ratio of the thickness of the base material to the total thickness of the mating materials in the three-layer clad steel plate including the low-carbon steel base material and the stainless steel mating materials each disposed on either surface of the base material can provide a clad steel plate having a good heat transfer rate and excellent adhesiveness between the base material and the mating materials.

Further, provision of the plurality of protruded portions and depressed portions on a surface of at least one of the mating materials of the three-layer clad steel plate can reduce a cross-sectional area of the three-layer clad steel plate, allowing for a further improved heat transfer coefficient.

Moreover, when the percentage (protrusion area percentage) of the area of the protruded portions relative to the surface area of a mating material is 20 to 80%, or the depression-protrusion difference is 0.02 to 0.2 mm in the plate thickness direction, even better thermal conductivity can be retained, allowing for prolonged use.

PREFERRED MODE FOR CARRYING OUT THE INVENTION

Figure 1:
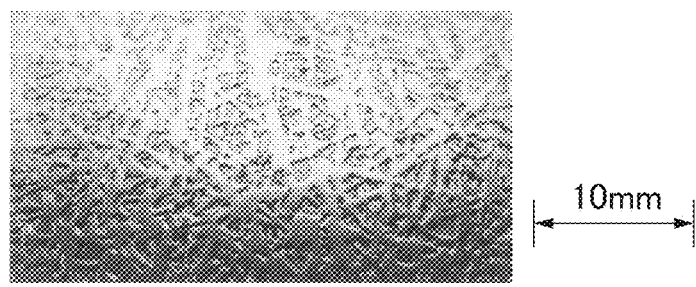
FIG. 1 shows the appearance of a clad steel plate produced in an Example.

Below, the embodiments of the present invention will be described. The descriptions of these shall not limit the present invention.

An embodiment of the present invention is a three-layer clad steel plate including: low carbon steel as a base material; and stainless steel as mating materials (hereinafter may also be referred to as "outer layers") each disposed on either surface of the base material, in which a plate thickness ratio L defined as the thickness of the base material/the total thickness of the outer layers is 1.0 to 5.0 with regard to the thicknesses of the base material and the mating materials, and a plurality of protruded portions and depressed portions are formed on at least one surface of the clad steel plate.

(Clad Steel Plate)

The three-layer clad steel plate according to an embodiment of the present invention (hereinafter may also be referred to as the "three-layer clad steel plate") may be manufactured mainly via hot rolling, annealing, and cold rolling. Specifically, metal plates as raw materials of the three layers are laminated, and a release material such as Ni foil is further laminated on the both sides of these, which is then placed inside a bag made of a foil or thin sheet of a metal having oxidation resistance such as stainless steel. Subsequently, the bag is vacuum pumped, and then filled with an inert gas such as nitrogen gas, and then heated from the outside of the bag to allow laminated metal plates to be diffusion bonded. After diffusion bonded, hot rolling may be performed to obtain a desired plate thickness, and then annealing and cold rolling may be further repeated to obtain a flat three-layer clad steel plate. It is noted that the last step before the embossing process described below is preferably an annealing step.

There is no particular limitation for the type of the base material of the three-layer clad steel plate. Steel plates such as those made of low carbon steel, medium carbon steel, high carbon steel, alloy steel, and the like can be used as the base material. When good press-formability is required, deep drawing steel plates such as those made of low carbon steel alloyed with Ti, low carbon steel alloyed with Nb, and the like are preferred as an underlying steel plate. Further, high-strength steel plates alloyed with P, Si, Mn, and the like may be used.

When low carbon steel is used as the base material, for example, SPCC as defined in JIS G 3141 is preferred. Specifically, those may be used having a carbon concentration of 0.15% by mass or less, a manganese concentration of 0.60% by mass or less, a phosphorus concentration of 0.10% by mass or less, and a sulfur concentration of 0.05% by mass or less.

There is no particular limitation for the type of stainless steel used for the mating materials of the three-layer clad steel plate. Ferrite-based, austenite-based, or biphasic stainless steel plates may be used as the mating materials, depending on usage environments of a clad steel plate. When the usage environments of the clad steel plate are relatively mild with regard to corrosion, a ferrite-based stainless steel plate, which is less expensive, can be used. In usage environments where acid resistance and workability are important, an austenite-based stainless steel plate may be preferably used as the mating materials. Alternatively, when high strength and pitting resistance are required, a biphasic stainless steel plate may be used as the mating materials.

Further, there is no particular limitation for the surface finishing process of stainless steel plates as the mating materials of the three-layer clad steel plate, and any known means may be used. The thicknesses of two mating materials each disposed on either surface of the base material may be the same or different. When the clad steel plate is to be subjected to plastic working such as bending, stainless steel plates with different thickness may also be used as the mating materials depending on the method of working for plastic working and the shape after working.

(Embossing Process)

The clad steel plate according to an embodiment of the present invention has a plurality of protruded portions and depressed portions on at least one surface thereof. Formation of a depression-protrusion pattern including protruded portions and depressed portions on a surface of the clad steel plate can further improve thermal conductivity from one side, e.g., a heated side, of the clad steel plate to the other side, e.g., a non-heated side. As a means of providing such a depression-protrusion pattern, for example, embossing process may be used. Specifically, the rolling method, the press working, and the like may be used.

With regard to a method of embossing, the rolling method using a emboss roll has superior productivity. Even when an emboss roll used for rolling is worn or damaged, the profile of the emboss roll can be reworked by performing cutting or etching process. Therefore, the rolling method is also preferred in view of cost reduction.

Figure 8:
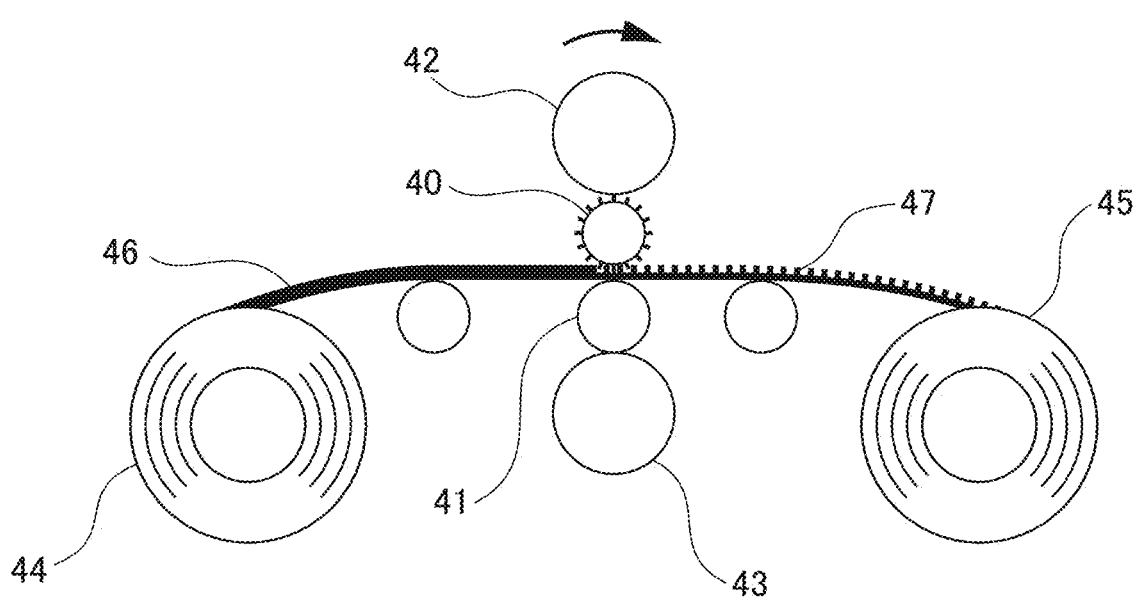
FIG. 8 schematically shows a method of manufacture in which embossing is performed to form depressions and protrusions on a surface of a clad steel plate by the rolling process.

When the rolling method as described above is used, a four-stage rolling machine, for example, as shown in FIG. 8 may be used. This four-stage rolling machine is configured to include a stepped roll 40 as an upper work roll having a depression-protrusion pattern and a flat roll 41 as a lower work roll having no depression-protrusion pattern, both of which have back-up rolls 42 and 43, respectively. The stepped roll 40 has a roll profile in which a plurality of large-diameter portions and small-diameter portions are arranged in the axis direction and the circumferential direction. A predetermined depression-protrusion pattern is transferred to a clad steel plate 46 fed to the four-stage rolling machine through a pay-off reel 44 from the roll profile on the stepped roll 40 to obtain a clad steel plate 47 having a plurality of protruded portions and depressed portions formed on a surface thereof (hereinafter may also be referred to as a "depression-protrusion clad steel plate"). Then, the depression-protrusion clad steel plate 47 having a plurality of protruded portions and depressed portions is retrieved in a take-up reel 45. It is noted that when a depression-protrusion pattern is formed on the both sides of the clad steel plate 46, a stepped roll (not shown) instead of the flat roll 41 may be used as the lower roll to perform the aforementioned rolling operations.

(Protrusion Area Percentage)

Figure 2:
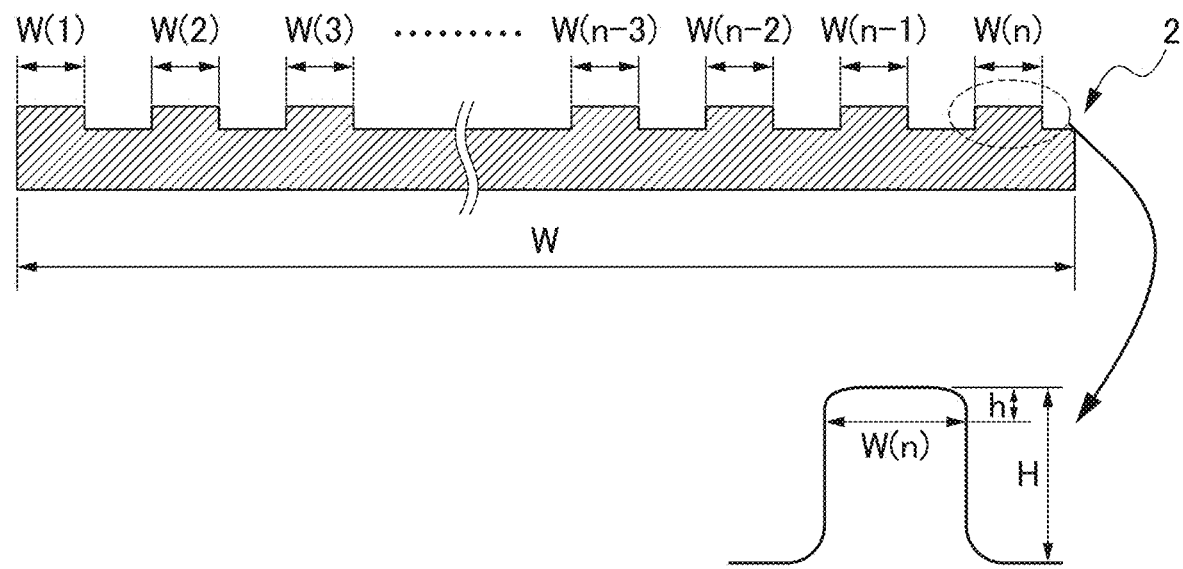
FIG. 2 schematically shows a cross section of a clad steel plate for illustrating the protrusion area percentage and depression-protrusion difference of the clad steel plate.

The percentage of the area of protruded portions on the clad steel plate relative to the surface area of the clad steel plate on which the protruded portions are formed (hereinafter may also be referred to as the "protrusion area percentage") is preferably 20 to 80%. FIG. 2 is a schematic diagram for illustrating the definition of the protrusion area percentage with reference to a structure where a plurality of protruded portions and depressed portions are configured to be lined on a surface of a steel plate. In general, the protrusion area percentage refers to a percentage of the area of protruded portions occupying a surface of a steel plate. As used herein, the protrusion area percentage is defined as a percentage of the sum of an area $W(1)$, $W(2)$, ... $W(n)$ of the corresponding protruded portions relative to the overall surface area $W$ at a height lower by 10% from a protrusion height H ($H-h=0.9H$) wherein the protrusion height H is a distance between the top of a protruded portion and the bottom of a depressed portion, and $h$ ($=0.1 \times H$) is 10% of the protrusion height H as shown in FIG. 2. That is, the protrusion area percentage can be expressed as follows.

$$\text{Protrusion area percentage} = \frac{(W(1) + W(2) + W(3) + \ldots + W(n-1) + W(n))}{W} \times 100(\%)$$

Figure 3:
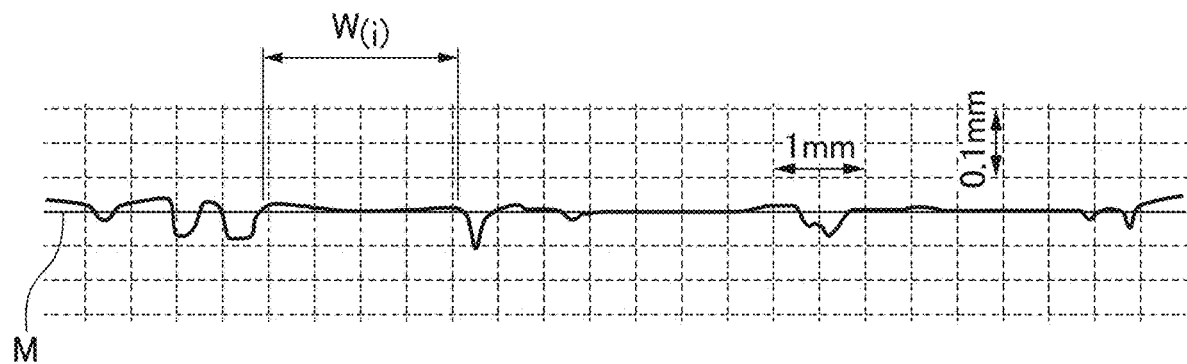
FIG. 3 shows a two-dimensional profile of the surface of the clad steel plate from an Example on which a depression-protrusion pattern is formed.
Figure 4:
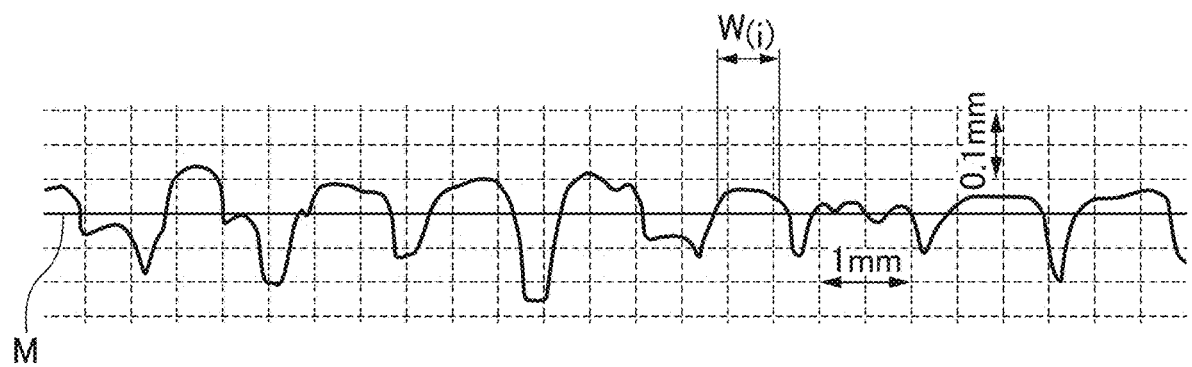
FIG. 4 shows a two-dimensional profile of the surface of the clad steel plate from another Example on which a depression-protrusion pattern is formed.

The protrusion area percentage can be calculated as follows. First, a two-dimensional profile where the vertical axis corresponds to the plate thickness direction as shown in FIG. 3 and FIG. 4 is obtained from a region arbitrary selected from a surface of a clad steel plate. Then, a distance (the protrusion height H) is measured between the top of a protruded portion and the bottom of a depressed portion for the protruded portions shown in the above two-dimensional profile. The protrusion height H is determined based on a distance at each of the depressed portions located in either side of a protruded portion. A reference point is then determined by subtracting 0.1 times from the resulting protrusion height. Subsequently, the sum of the area of a portion of each protruded portion included between the reference points is divided by the overall area of the selected region to calculate a protrusion area percentage. In FIG. 3 and FIG. 4, an example of a portion used for measuring the area of a protruded portion is indicated as W(i).

Here, the data of the two-dimensional profile is linearly approximated for protruded portions and depressed portions of a clad steel plate, and the slope of the resulting straight line is further corrected horizontally to identify a reference line M. Portions located above the reference line M on the surface are considered as protruded portions to be measured.

A protrusion area percentage of less than 20% increases a proportion of portions where depressed portions are formed with large-diameter portions of a stepped roll upon forming a depression-protrusion pattern by the rolling method, resulting in an increased burden to the roll due to increased rolling load. This will reduce the life time of the roll, and result in increased manufacturing cost. On the other hand, when the protrusion area percentage is more than 80%, an effect for improving thermal conductivity is small.

Depression-Protrusion Difference

The depression-protrusion difference is preferably 0.02 to 0.2 mm in the plate thickness direction of a depression-protrusion clad steel plate. The depression-protrusion difference corresponds to the protrusion height H as shown in FIG. 2. The depression-protrusion difference as used herein is computed as follows. Two-dimensional profiles at 5 positions over an area of an arbitrary region (for example, within the range of 100 mm²) on a surface of a steel plate were measured for determining a protrusion height at each position. The mean value of the protrusion heights at these points was considered as the depression-protrusion difference. When the depression-protrusion difference is less than 0.02 mm, the clad steel plate may be more susceptible to wear during use, and thus prolonged use may be difficult. On the other hand, a depression-protrusion difference of more than 0.2 mm may increase burden to a roll due to increased rolling load upon forming a depression-protrusion pattern by the rolling method. This will reduce the life time of the roll, and result in increased manufacturing cost. Further, the clad steel plate may be significantly work-hardened, which may have a significant impact on workability after depressions and protrusions are formed.

A clad steel plate can retain good thermal conductivity, and can be used for a prolonged time when it has a protrusion area percentage of 20 to 80% and a depression-protrusion difference of 0.02 to 0.2 mm as described above.

(Depression-Protrusion Pattern)

As described above, a clad steel plate can be used in which a depression-protrusion pattern including protruded portions and depressed portions are formed by embossing process. A pattern of the depression-protrusion pattern may be regular, or may be partially or entirely random. For example, a random depression-protrusion pattern may be formed as shown in FIG. 1.

The cross section of two-dimensional profiles of a clad steel plate having a depression-protrusion pattern on a surface thereof are shown in FIG. 3 and FIG. 4. FIG. 3 shows the two-dimensional profile of a clad steel plate having a depression-protrusion pattern where the protrusion area percentage is about 80%, and the depression-protrusion difference is about 0.06 mm. FIG. 4 shows the two-dimensional profile of a clad steel plate having a depression-protrusion pattern where the protrusion area percentage is about 55%, and the depression-protrusion difference is about 0.20 mm.

The depression-protrusion patterns in FIG. 3 and FIG. 4 represent examples where the protrusion area percentage falls within the range of 20 to 80%, and the depression-protrusion difference falls within the range of 0.02 to 0.20 mm. Formation of a plurality of depressed portions on a surface of a clad steel plate reduces the cross-sectional area of the clad steel plate, increasing the heat transfer rate of the clad steel plate. Further, a depression-protrusion pattern formed on a surface of a clad steel plate in a highly random manner in the pattern direction can allow origins of water-boiling to be widely distributed, leading to uniform boiling, for example, throughout the inside of a cookware product when that depression-protrusion clad steel plate is used as a material of the cookware product. This is effective in view of shortened cooking time because heat is uniformly transferred to food materials. Further, according to an embodiment of the present invention, a relatively large depression-protrusion pattern may be formed on a clad steel plate. In particular, when the depression-protrusion pattern is formed by the rolling method, mechanical strength may also be enhanced by virtue of work hardening. Therefore, a clad steel plate having excellent abrasion resistance which can withstand prolonged use can be obtained.

(Plate Thickness Ratio L)

The plate thickness ratio L of a clad steel plate is defined by the following Equation (1) using the thickness of a base material and the total thickness of mating materials:

$$\text{the plate thickness ratio } L = \text{the thickness of the base material/the total thickness of the mating materials} \quad \text{Equation (1)}.$$

The mating materials are each disposed on either surface of the base material, and thus the total thickness of the mating materials each disposed on either surface is used in Equation (1). The thickness of the base material and the thicknesses of the mating materials are those at protruded portions.

A plate thickness ratio L of less than 1.0 means that the proportion of mating materials in a clad steel plate is large. When mating materials are made of a material (stainless steel) having a relatively lower heat conductivity than a base material (carbon steel), the heat conductivity of the resulting clad steel plate may be decreased. Moreover, mating materials may be detached from a base material at a working site due to different ductility between the base material and the mating materials when comprehension stress is exerted on a clad steel plate during work. On the other hand, a plate thickness ratio of more than 5.0 means that the proportion of mating materials is excessively small. This may result in breakage of the mating materials (stainless steel plates) when a clad steel plate is subjected to plastic working such as bending. Therefore, the plate thickness ratio L preferably falls within the range of 1.0 to 5.0. The lower limit thereof is more preferably 1.5, even more preferably 2.0. The upper limit thereof is more preferably 4.0, even more preferably 3.5.

EXAMPLES

Below, Examples of the present invention will be described. The present invention shall not be limited to the following Examples.

First, the following four types of three-layer clad steel plates were manufactured. It is noted that the four types of three-layer clad steel plates manufactured each have a plate thickness of 0.8 mm. Hereinafter, the "plate thickness ratio L" may also be referred to as the "plate thickness ratio."

(1) A three-layer clad steel plate including a base material made of a cold rolled steel plate of 0.64-mm thick SPCC (JIS G 3141) (hereinafter referred to "SPCC") and mating materials made of 0.08-mm SUS304 each disposed on either surface thereof; and having a plate thickness ratio of 4.0.

(2) A three-layer clad steel plate including a base material made of 0.56-mm thick SPCC and mating materials made of 0.12-mm SUS304 each disposed on either surface thereof; and having a plate thickness ratio of 2.3.

(3) A three-layer clad steel plate including a base material made of 0.48-mm thick SPCC and mating materials made of 0.16-mm SUS304 each disposed on either surface thereof; and having a plate thickness ratio of 1.5.

(4) A three-layer clad steel plate including a base material made of 0.72-mm thick SPCC and mating materials made of 0.04-mm SUS304 each disposed on either surface thereof; and having a plate thickness ratio of 9.

Next, among these, the three-layer clad steel plates having a plate thickness ratio of 4.0, 2.3, and 1.5 were subjected to embossing process to form protruded portions and depressed portions on a surface of the respective three-layer clad steel plate using a four-stage rolling machine as shown in FIG. 8. Thereby, test pieces were obtained for the depression-protrusion clad steel plates of Examples 1 to 6. Working conditions for the embossing process were as follows: the diameter of a stepped roll in the four-stage rolling machine was 110 mm, and the rolling load was set according to the depression-protrusion differences shown in Table 1, and the rolling rate was 0.5 m/min.

Comparative Examples 1 and 2 are three-layer clad steel plates without embossing process.

It is noted that the plate thickness ratio at protruded portions of the depression-protrusion clad steel plates did not differ from that of the three-layer clad steel plates before forming a depression-protrusion pattern.

The protrusion area percentage and depression-protrusion difference of the depression-protrusion pattern formed on a surface of the depression-protrusion clad steel plate manufactured were measured from a profile obtained by expanding a region with an area of 100 mm² arbitrarily selected from the clad steel plate using a profile measuring machine (contracer). Examples of the two-dimensional profile, the two-dimensional profiles of the clad steel plates from Examples 1 and 4 in which the vertical axis corresponds to the plate thickness are shown in FIG. 3 and FIG. 4, respectively. Various properties of the depression-protrusion clad steel plates manufactured are shown in Table 1.

TABLE 1

| | Plate thickness ratio L | Depression-protrusion difference (mm) | Protrusion area percentage (%) |
|---|---|---|---|
| Example 1 | 4.0 | 0.06 | 80 |
| Example 2 | 2.3 | 0.06 | 80 |
| Example 3 | 1.5 | 0.06 | 80 |
| Example 4 | 4.0 | 0.20 | 55 |
| Example 5 | 2.3 | 0.20 | 55 |
| Example 6 | 1.5 | 0.20 | 55 |
| Comparative Example 1 | 1.5 | — | — |
| Comparative Example 2 | 9.0 | — | — |

(Tests for Evaluating Heat Transfer Properties)

Tests for evaluating a heat transfer rate were performed according to the following procedure. A test piece having a standardized and predetermined surface area (A) and thickness (B) was produced, and thermocouples were each attached to either surface thereof, i.e., either a front or back surface thereof. Then, the test piece was heated on an electromagnetic cooker at a constant power (E) to measure temperature at the both surfaces, i.e., the front and back surfaces of the test piece. A temperature difference (D) was obtained from the measured temperature values, and a heat transfer rate (C) was computed by the following equation (2). The larger is the heat transfer rate (C), the larger is the amount of heat transferred from a heated side to a non-heated side through a test piece. Therefore, a larger heat transfer rate indicates that heat transfer is facilitated.

$$C=(E \times B)/(A \times D) \qquad \text{Equation (2)}$$

In the heating test, a square test piece with a side length of 50 mm was cut out from a depression-protrusion clad steel plate having a depression-protrusion pattern, and this was placed on an electromagnetic cooker set at a power of 500 W, and then heated until a heated surface of the test piece reached a target temperature. The target temperature was set at 100° C., 300° C., and 500° C. because a heat transfer rate changes depending on heating temperature.

Heat transfer properties were evaluated based on the computed heat transfer rate (W/m·K). The evaluation results are shown in Table 2. Evaluation criteria were as follows: those having a heat transfer rate improved by 50% or more relative to Comparative Example 1 were designated as "very good"; those improved by 25% or more but less than 50% were designated as "good"; those improved by 5% or more but less than 25% were designated as "fair"; and those improved by less than 5% were designated as "poor."

(Tests for Evaluating Workability)

Workability was evaluated according to the following procedure. A rectangular test piece with a longer side length of 50 mm and a shorter side length of 20 mm was cut out from a depression-protrusion clad steel plate having a depression-protrusion pattern. The above rectangular test piece was subjected to contact bending at the center portion of the longer side thereof, and then the presence or absence of a crack at the working site around the center portion was visually observed for evaluation. The evaluation results are shown in Table 2. A test piece having no observable crack was designated as "good"; those having an observable crack was designated as "poor."

TABLE 2

| | Evaluation of thermally conductivity | | | | | |
|---|---|---|---|---|---|---|
| | 100° C. | | 300° C. | | 500° C. | |
| | Heat transfer rate (W/m · K) | Evaluation | Heat transfer rate (W/m · K) | Evaluation | Heat transfer rate (W/m · K) | Evaluation | Evaluation of workability |
| Example 1 | 53.7 | very good | 50.5 | good | 44.2 | good | good |
| Example 2 | 43.2 | fair | 41.6 | fair | 37.9 | fair | good |
| Example 3 | 37.6 | fair | 36.6 | fair | 33.7 | fair | good |
| Example 4 | 56.7 | very good | 53.3 | very good | 46.6 | good | good |
| Example 5 | 45.6 | good | 43.9 | good | 40.0 | good | good |
| Example 6 | 39.7 | fair | 38.7 | fair | 35.6 | fair | good |
| Comparative Example 1 | 35.7 | — | 34.8 | — | 32.0 | — | good |
| Comparative Example 2 | 61.0 | very good | 60.0 | very good | 42.0 | good | poor |

(Evaluation Results of Thermal Conductivity)

As shown in Table 1, Examples 1 to 6 are depression-protrusion clad steel plates each having a depression-protrusion pattern formed on a surface of a steel plate and having a plate thickness ratio L of 1.0 to 5.0. As shown in Table 2, the depression-protrusion clad steel plates from Examples 1 to 6 were found to have better thermal conductivity as compared with the clad steel plate having no depression-protrusion pattern from Comparative Example 1.

A depression-protrusion clad steel plate, which is a composite material, has a heat transfer property in which a thermal gradient θ varies across the plate thickness direction. When the heat transfer rate of the base material (SPCC) is compared with that of the mating materials (SUS304), the heat transfer rate of SUS304 is smaller than that of SPCC. This means that the thermal gradient θ1 of the mating materials (stainless steel)>the thermal gradient θ2 of the base material (carbon steel).

Figure 5:
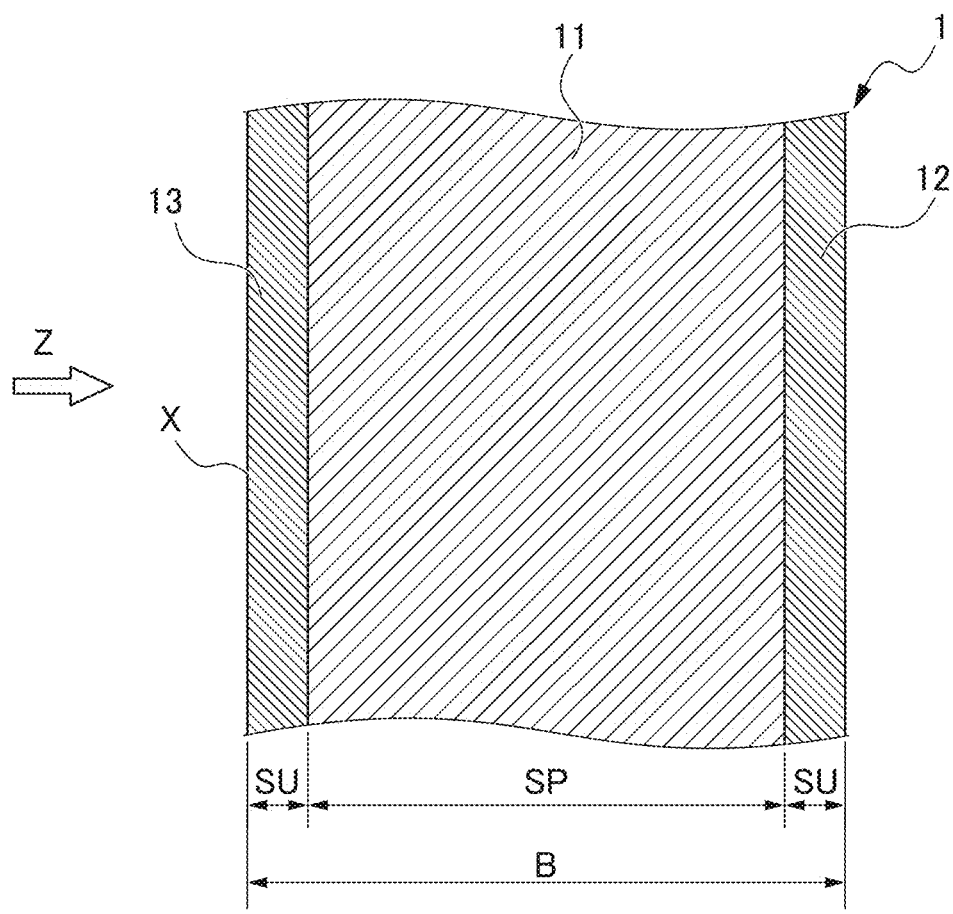
FIG. 5 schematically shows a heat transfer profile of a flat clad steel plate.
Figure 5:
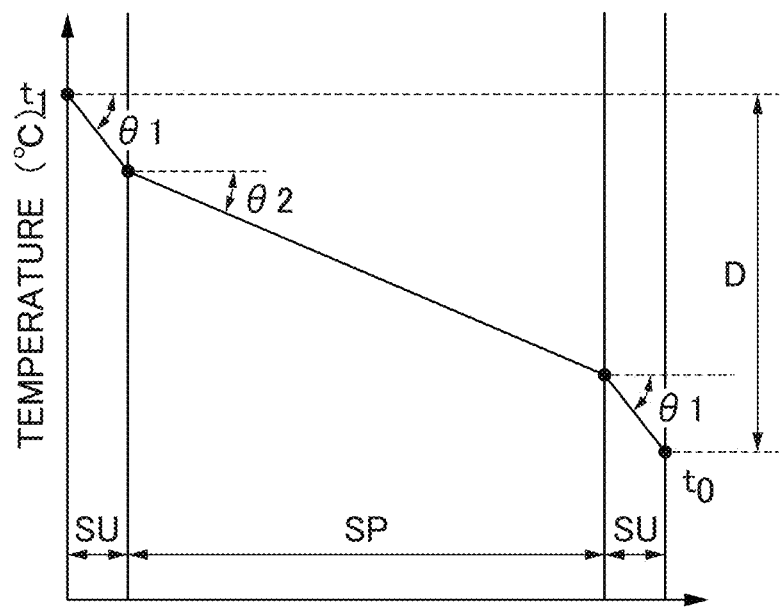
Figure 6:
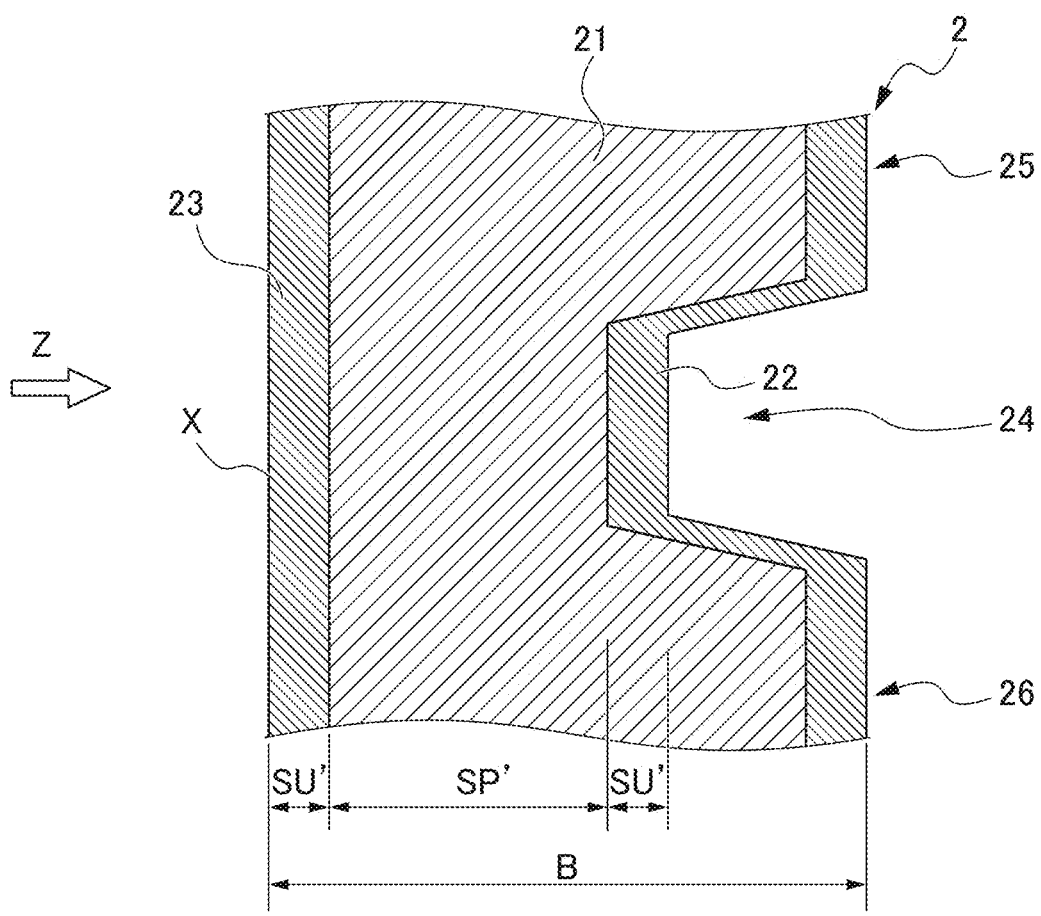
FIG. 6 schematically shows a heat transfer profile of a clad steel plate having a depression-protrusion pattern formed on a surface of a mating material.
Figure 6:
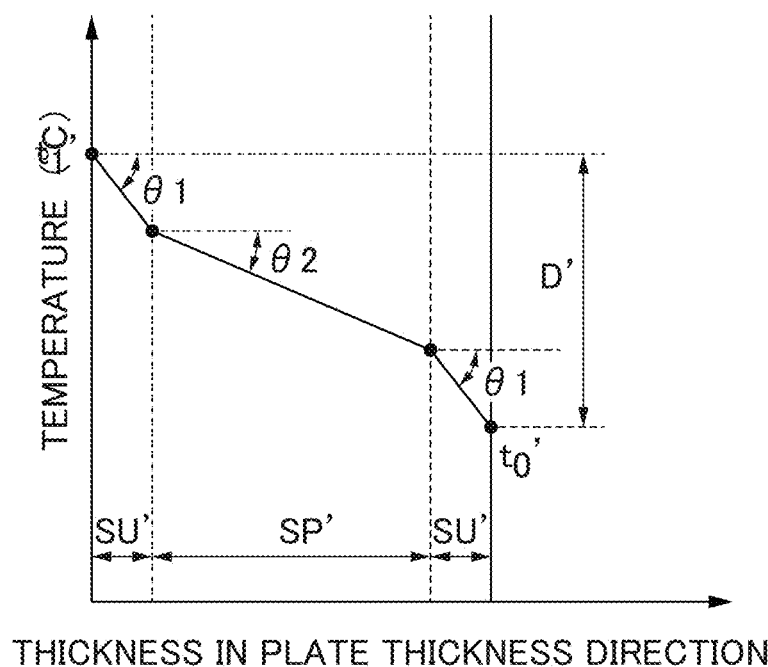

FIG. 5 and FIG. 6 both schematically show how heat is transferred through a clad steel plate having a thickness ratio L of 4.0 in the heating test. A heating direction Z from a heat source (not shown) to a heated surface X is shown in FIG. 5 and FIG. 6. In such heating, the difference D between a temperature t1 of the heated surface X of a three-layer clad steel plate 1 having no depression-protrusion pattern and a temperature t0 of the opposite surface is appropriately the same at any position in the plate width direction as shown in FIG. 5. However, in the depression-protrusion clad steel plate 2 having a depression-protrusion pattern, a temperature difference D' at a portion (depressed portion) having a small plate thickness is smaller than the temperature difference D at a portion (protruded portion) having a large plate thickness because the thickness of the carbon steel is smaller in the plate thickness direction as shown in FIG. 6. As described above, the depression-protrusion clad steel plate having a depression-protrusion pattern shows a thermal gradient varying both in the plate thickness direction and the plate width direction.

Figure 7:
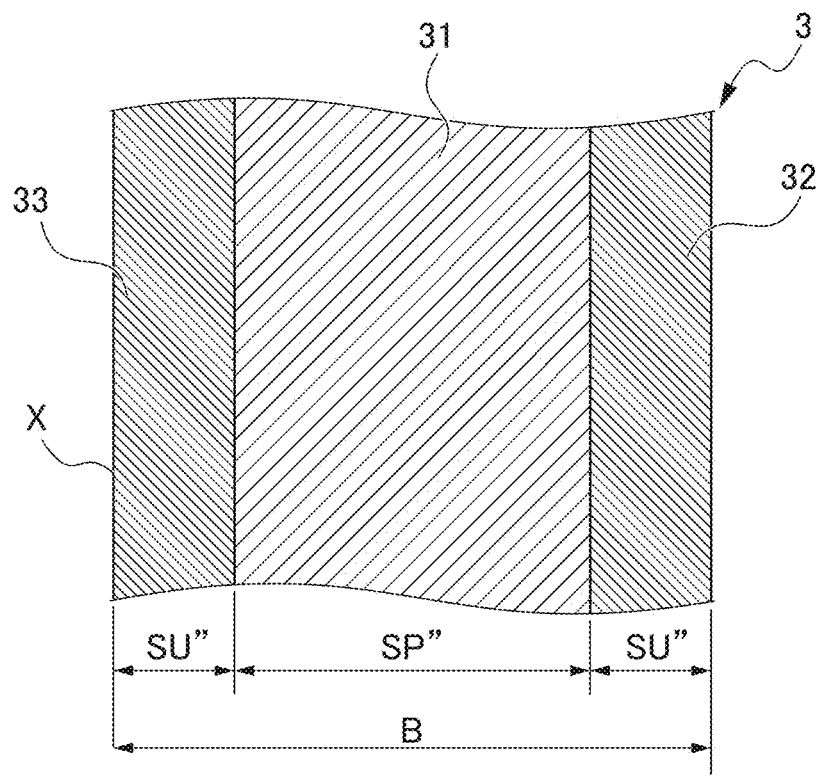
FIG. 7 schematically shows a heat transfer profile of another flat clad steel plate.
Figure 7:
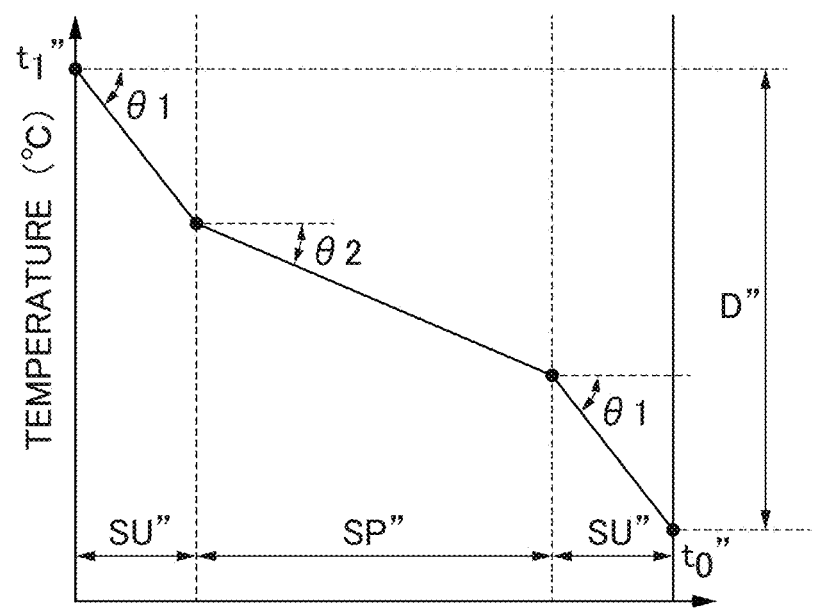

FIG. 7 schematically shows how heat is transferred through a three-layer clad steel plate 3 without a depression-protrusion pattern having a plate thickness ratio L of 1.5 in the heating test. The plate thickness B of the three-layer clad steel plate 3 is the same as that of the three-layer clad steel plate 1 in FIG. 5. The thermal gradient in the plate thickness direction may also vary depending on the plate thickness ratio. Accordingly, the temperature difference between temperatures of the heated surface X and the opposite surface may also be different. When the plate thickness ratio L is smaller than that of the three-layer clad steel in FIG. 5, the proportion of the mating materials (stainless steel) having a small heat transfer rate is large even in a case where the plate thickness B is the same. Therefore, a temperature difference D" will be larger than the temperature difference D.

As described above, a depression-protrusion clad steel plate having better thermal conductivity can be obtained when a depression-protrusion pattern having a large depression-protrusion difference and a small protrusion area percentage is formed on a surface of the clad steel plate, and further a base material having a large heat transfer rate such as carbon steel is used so as to have a high plate thickness ratio.

(Evaluation Results of Workability)

Results from workability evaluation by contact bending are shown in Table 2 for the depression-protrusion clad steel plates from Examples and the clad steel plates from Comparative Examples. Examples 1 to 6 and Comparative Example 1 did not show a crack in stainless steel plates as the mating materials. In contrast, Comparative Example 2 showed a crack in stainless steel at the outer side of the test piece which was bent. Comparative Example 2 has a plate thickness ratio (carbon steel/stainless steel) of 9.0 and a relatively small thickness of the mating materials (stainless steel). When contact bending is performed on a test piece, the tensile stress exerted on the surface of a test piece will concentrate on a mating material. Therefore, the concentrated stress exerted on the test piece of Comparative Example 2 presumably exceeded the mechanical strength of the mating material (stainless steel), resulting in a crack. Further, contact bending was found to be possible when the plate thickness ratio (carbon steel/stainless steel) was 7.0 or less.

As described above, the product value was able to be increased, for example, good thermal conductivity was obtained, and crack development upon working was prevented, when the conditions of the present invention were satisfied.

EXPLANATION OF REFERENCE NUMERALS 1, 3 Three-layer clad steel plate having no depression-protrusion pattern
2 Depression-protrusion clad steel plate
11, 21, 31 Carbon steel
12, 13, 22, 23, 32, 33 Stainless steel
24 Depressed portion
25, 26 Protruded portion
B Plate thickness of clad steel plate
SP, SP" Thickness of carbon steel
SU, SU" Thickness of stainless steel
SP' Thickness of carbon steel at depressed portion
SU' Thickness of stainless steel at depressed portion
t1, t1', t1" Temperature at heated surface
t0, t0', t0" Temperature at surface opposite to heated surface
D, D', D" Difference between temperatures of heated surface and surface opposite to heated surface
X Heated surface
Z Heating direction
θ1 Thermal gradient in stainless steel
θ2 Thermal gradient in carbon steel
40 Upper work roll (stepped roll)
41 Lower work roll (flat roll)
42 back-up roll
43 back-up roll
44 Pay-off reel
45 take-up roll
46 Three-layer clad steel plate having no depression-protrusion pattern
47 Depression-protrusion clad steel plate having depression-protrusion pattern

The invention claimed is:

1. A three-layer clad steel plate comprising: a carbon steel base material; and stainless steel mating materials each disposed on either surface of the base material,
  a plate thickness ratio, L, represented by: the thickness of the base material/the total thickness of the mating materials, is a value from 1.0 to 5.0,
  a plurality of protruded portions and depressed portions being formed on at least one surface of the clad steel plate,
  wherein the thickness of the base material and the thicknesses of the mating materials are those at the protruded portions,
  the area of the plurality of protruded portions is 20 to 80% relative to the area of a surface of the clad steel plate on which the protruded portions are formed, and
  the plurality of protruded portions and depressed portions have a depression-protrusion difference of 0.02 mm or more to 0.2 mm or less in the plate thickness direction.

* * * * *